(12) United States Patent
Kotlick

(10) Patent No.: US 8,373,129 B2
(45) Date of Patent: Feb. 12, 2013

(54) CARGO INSPECTION SYSTEM FOR SPECIAL NUCLEAR MATERIALS (SNM)

(75) Inventor: David S. Kotlick, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 280 days.

(21) Appl. No.: 12/587,865

(22) Filed: Oct. 14, 2009

(65) Prior Publication Data

US 2010/0090097 A1 Apr. 15, 2010

Related U.S. Application Data

(60) Provisional application No. 61/105,350, filed on Oct. 14, 2008.

(51) Int. Cl.
*G01T 1/204* (2006.01)
*G21G 1/06* (2006.01)
(52) U.S. Cl. ........... 250/358.1; 250/390.01; 250/390.04; 376/159
(58) Field of Classification Search .................. 250/251, 250/390.01, 390.04, 390.11–390.12, 393, 250/394, 358.1; 376/153–154, 157–158, 376/163

See application file for complete search history.

(56) References Cited

U.S. PATENT DOCUMENTS

| 5,378,895 | A  | * | 1/1995  | Cole et al. ................. 250/390.04 |
| 7,420,175 | B2 | * | 9/2008  | Chu et al. .................... 250/358.1 |
| 2005/0023474 | A1 | * | 2/2005  | Persyk et al. .............. 250/370.1 |
| 2005/0072932 | A1 | * | 4/2005  | Bryman .................... 250/370.11 |
| 2008/0240329 | A1 | * | 10/2008 | Norman et al. ............... 376/154 |
| 2009/0175401 | A1 | * | 7/2009  | Bertozzi et al. ............... 376/154 |

FOREIGN PATENT DOCUMENTS

WO     WO 2006073438 A2 *  7/2006

* cited by examiner

*Primary Examiner* — Jack Berman
*Assistant Examiner* — David E Smith
(74) *Attorney, Agent, or Firm* — John V. Daniluck; Bingham Greenebaum Doll LLP

(57) ABSTRACT

A system and method for detection of special nuclear materials within a larger space is disclosed and claimed. Gamma rays emitted from special nuclear materials upon neutron interrogation detected. An associated-particle neutron generator provides interrogation neutrons.

16 Claims, 3 Drawing Sheets

CARGO INSPECTION SYSTEM FOR SPECIAL NUCLEAR MATERIALS (SNM)

This application claims priority from Provisional Application No. 61/105,350 filed Oct. 14, 2008.

INVENTION SUMMARY

Approximately 20 million shipping containers passed through United States ports each year. US Customs and Border Protection Document, "Securing America's Borders at Ports of Entry" (2007).

A complete system to detect Special Nuclear Materials (SNM) based on neutron in, to cause nuclear fission, followed by the coincident detection of multiple prompt fission gamma rays as a signature for SNM is disclosed. Special Nuclear Materials are fissile materials: U-235, and Pu-239. The detection system includes the probe particle generator(s), signature particles detector, front-end electronics, coincidence and trigger electronics, event processor and data acquisition system, and algorithms to locate the SNM within the cargo volume.

Prior systems such as the "nuclear car wash" (D. Slaughter et al., The nuclear car wash: a system to detect nuclear weapons in commercial cargo shipments. Nuclear Inst. and Methods in Physics Research, A, v579, August 2007.; D. Slaughter et al., The "nuclear car wash": a scanner to detect illicit special nuclear material in shipping containers. IEEE Sensors Journal, v 5, August 2005.; D. Slaughter et al., LaWrence Livermore National Laboratory Report # UCRL-ID 155315 (2003).), depend on delayed gamma ray and neutron production. The disclosed system uses prompt gamma ray production which has signal strength approximately 100 times stronger than the delayed gamma signal. The stronger prompt gamma ray signal allows a corresponding reduction in neutron bombardment without sacrificing sensitivity. Radiation levels on the cargo are then reduced by a factor of 100 as well as the overall safety of the system within its operating environment.

The disclosed detector of the system is advantaged because it does not does not require the accurate energy measurement of nuclear states by expensive, radiation intolerant, low solid angle coverage, High Purity Germanium (HPGe) detectors. The disclosed system uses liquid noble gas detectors with high detection efficiency, high solid angle coverage, and sub-nanosecond timing resolution. The disclosed system is capable of distinguishing between U-238 and U-235 while imaging the location of the SNM within a larger space, for example, an ocean going shipping container.

The disclosed system includes associated-particle 14 MeV-neutron generators capable of generating $10^9$ neutrons/second. For examination of containers such as ocean-going shipping containers, two or more such generators may be employed. The detection of gamma rays generated by bombardment of SNM by 14 MeV neutrons is detected by detectors capable of nano-second timing. Noble liquid detectors described herein are capable of nanosecond timing. A shipping container rapidly passing through the neutron generator and detector system may be scanned for SNM.

The system has two important modes of operation. The first mode is a time coincidence of three (3) adjacent detector panels and the alpha particle associated with neutron production. This four (4) level coincidence in a narrow 10-15 nanosecond timing gate is set by the time for the gamma radiation to cross the shipping container and provides excellent rejection of random uncorrelated gamma rays. The four (4) level coincidence will have excellent background rejection even if each detector panel has single rates as high as 1-MHz.

For purposes of the description and claims, events described as 'coincident' are events related in time and occur within a chosen time gate. Generated gamma rays assumed for these purposes to travel at 30 cm/nanosecond will not impact both near and far detectors at precisely the same nanosecond. Nonetheless, 'coincident' herein describes such events, and other related events as 'coincident.'

Imaging and additional background rejection is enhanced by pixel segmentation of the associated alpha particle detector, which covers 8% solid angle, and its sub-nanosecond-timing resolution. In this detection mode, 14 MeV neutrons cause fast fission reaction in SNM with cross sections on the order of 1 barn. High energy neutrons also cause fission in fertile material such as U-238 which has a nuclear cross section similar to the fissile U-235.

A second mode of detection, which is triggered by a four (4) level coincidence of four (4) adjacent LNB-gamma-ray detector panels in a narrow 10-15 nanosecond timing gate and is assumed to be in anti-coincidence with the associated alpha particle signal and therefore not associated with the alpha particle correlation with prompt neutron production. The production of these multiple coincident gamma ray events are attributed to slow neutron capture by SNM materials.

Imaging of the SNM for the events not associated with the alpha particle correlation is accomplished by the intersection of the four (4) detectors nanosecond timing arcs within the cargo volume. Non-fissile materials such as U-238 do not produce signals not associated with the alpha particle signals and for this reason comparison of multiple gamma ray coincidence associated with alpha particle signals and multiple gamma ray coincidence not associated with alpha particle signals events offers two independent methods of imaging the location of the SNM within the cargo volume as well as a method to distinguish U-238 from U-235.

Efforts to shield SNM from detection by neutron bombardment may be frustrated by the system. Low mass nuclei such as hydrogenous materials respond to fast neutrons (14 MeV neutrons) by thermalizing the neutron resulting in neutron capture by the SNM. These neutron capture reactions occur at locations not predictable by the alpha particle timing signals. However the neutron capture produces above background gamma rays that may be located in a single voxel by intersecting arcs from four (4) panels of noble-liquid detectors.

Efforts to shield SNM by high mass nuclei such as lead will result in diffractive scattering forward from the heavy nuclei to cause fast fission reactions in the SNM. The location of the fast fission reaction will be predictable from the alpha particle timing signal and the detection signals from three adjacent noble-liquid gamma-ray detectors.

DESCRIPTION

Figure 2:
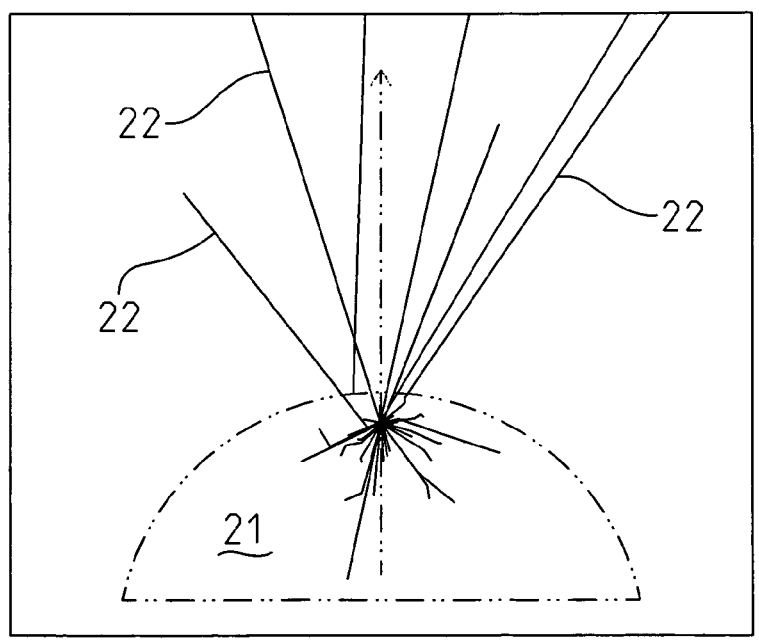
FIG. 2 illustrates gamma rays emerging as a 'jet' from the surface of SNM in response neutron capture.

A feature used for the detection of SNM, that reduces noise or background during the detection process, is the jet projection of gamma rays from neutron induced fission in SNM illustrated in FIG. 2. The figure illustrates a neutron induced fission event in a 1 kg sphere of U-235 21. Gamma ray production due to neutron induced fission is spatially uniform. However, due to the large electric charge of the nucleus and the high density of SNM, gamma rays 22 exit the surface of an extended amount of the material in a jet like shape. Gamma rays that propagate inward away from the surface are absorbed within the material.

The multi-gamma jet structure is useful to reduce background from random coincidences in the search for SNM. A signature of the potential presence of SNM is the detection of coincident gamma rays by adjacent detectors. It is not considered necessary to consider all possible combinations of coincident gamma ray detection by all detectors within the detector bank.

Figure 1:
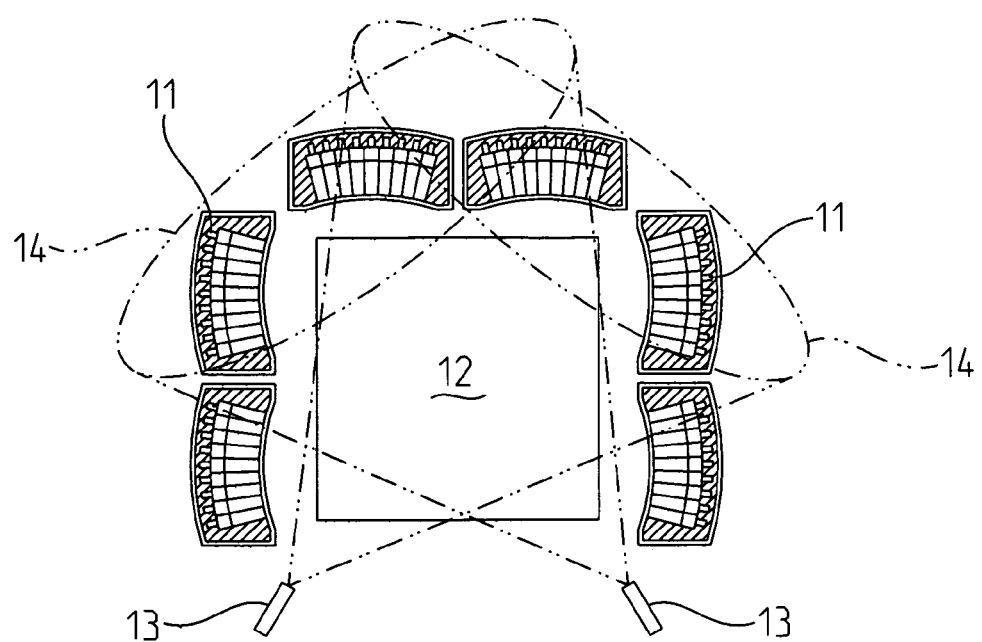
FIG. 1 illustrates the neutron generation and gamma ray detection portions of an interrogation system.

The rate at which background gamma-rays randomly occur in into the timing window is given by the following random coincidence relation:

$$R_{background} \sim mB^n \tau^{n-1}$$

where B is a detector's noise or singles rate; $\tau$ is the coincidence gate width; and n is the minimum number of required detector coincidence, and m is the number of distinct combinations of detectors that satisfy the coincidence condition out of the total number of detectors used. The expression is derived under the assumption $B\tau <<< 1$. An example illustrated in FIG. 1 used for explanation herein, shows noble liquid detectors grouped into panels along the length of a hypothetical shipping container 12 to achieve a total of six (6) distinct detector panels. Advantageously, the detector panels cover fifty percent (50%) of the solid angle as observed by SNM at the cross-sectional center of the interrogation region within the shipping container. By taking advantage of the jet structure of gamma ray propagation, and requiring three adjacent panels be in coincidence, the number of combinations of detectors which constitute an acceptable combination m drops from twenty (20) to (4) combinations, reducing the false coincidence rate by a factor of five (5).

For example if the chosen six-panel system is used, the number of combinations m for a 3-fold coincidence is four (4). If each panel has an uncorrelated singles rate of 1 MHz, and the gate time is set to 10 nanoseconds, the time for a gamma to complete cross the shipping container, then the 3-fold background rate is 400 Hz. Similarly for a 4-fold panel coincidence the rate is 3 Hz as the number of combinations is only three (3). As will be discussed below these rates are spread out over the entire cross sectional area of the shipping container.

Because the SNM signal appears in a single voxel of container, the effective background rate under the signal is limited to the background gamma radiation impacting the pixels of the detectors corresponding to that voxel. Thus, for a volume defined by 100 voxels, the background may be reduced by approximately 100.

A suitable associated-particle neutron generator is found in model A-920 manufactured by Thermo Fisher Scientific, Waltham, Mass. 02454, USA. E. Rhodes et al., "Advances in Associated-Particle Neutron Probe Diagnostics for Substance Detection", SPIE Vol. 2511, 1995. The A-920 has a maximum neutron flux yield of 1e neutrons per second in $4\pi$ steradians shown in FIG. 1 by the cone shaped projection 14 from the neutron generators 13. A deuterium-tritium fusion reaction takes place on the target of the generator resulting in the emission of a 14.1 MeV neutron and a 3.5 MeV alpha particle that travel in opposite directions to conserve linear momentum.

The system employs an alpha detector which provides timing data corresponding to the generation of a neutron. A suitable 3-inch active diameter alpha detector is available through 2K Corporation, W. Lafayette, Ind., USA. Incident 3.5-MeV alpha particles interact with the detector's gallium activated zinc oxide phosphor causing the phosphor to fluoresce with a life time of approximately 1 nanosecond. The alpha-induced scintillation light is collected and amplified by photomultiplier tubes or other light sensitive photo-transducers that are coupled to the exterior of the alpha detector's glass fiber light guide window. The alpha particle transducers can be pixelated by placing individual photo-transducers on the surface of the glass plate opposite the phosphor.

The thinness of the alpha detector floor coating makes it insensitive to x-rays, $\gamma$-rays and neutron radiation. A micron thick aluminum coating over the 7 micron ZnO(Ga) phosphor causes the detector to be insensitive to secondary radiation from electrons, deuterium ions and tritium ions from the target. In addition charged particles bleed off the aluminum coating, thereby preventing undesired charge build-up. The phosphor is made of inorganic materials with a high melting point because once the alpha detector is welded to the neutron generator head, the interior of the generator must satisfy ultra-high vacuum conditions and a high temperature bake out. For 3.5 MeV alpha particles, the ZnO(Ga) phosphor yield an excellent light output of 35-photoelectrons, a 1.5-nanosecond decay time and a 94% detection efficiency.

Data from the alpha detector is useful in the operation of the inspection system. The first mode considers multi-gamma events in a timing relationship with the alpha particle.

The second mode considers gamma events independent of the alpha signal and timing.

A useful attribute of an associated-particle neutron generator is its enhanced signal-to-noise ratio using the alpha particle timing information. The alpha detector may be segmented. For example the alpha detection plate might be pixelated using 1 cm diameter photomultiplier tubes.

FIG. 2 illustrates gamma ray production by 14 MeV neutrons 22 impacting SNM 21. Combinations of gamma detector signals which suggest fission due to neutron interaction on SNM produce a jet-shaped burst of gamma rays detectable on the noble liquid detectors that coincides (is time related) to alpha particle detection on an area of the alpha particle detector the size of a single pixel. In contrast, combinations of noble liquid detector signals which may falsely suggest a jet shaped burst of gamma rays would be unrelated in time to a single pixel on the alpha detector. The data acquisition computer would be capable of then separating the background noise from the neutron generation event. The segmentation of the alpha detector, is expected to reduce background under the signal by a factor of 16 due if 16 channels of pixelization are used for the alpha plate.

Figure 3:
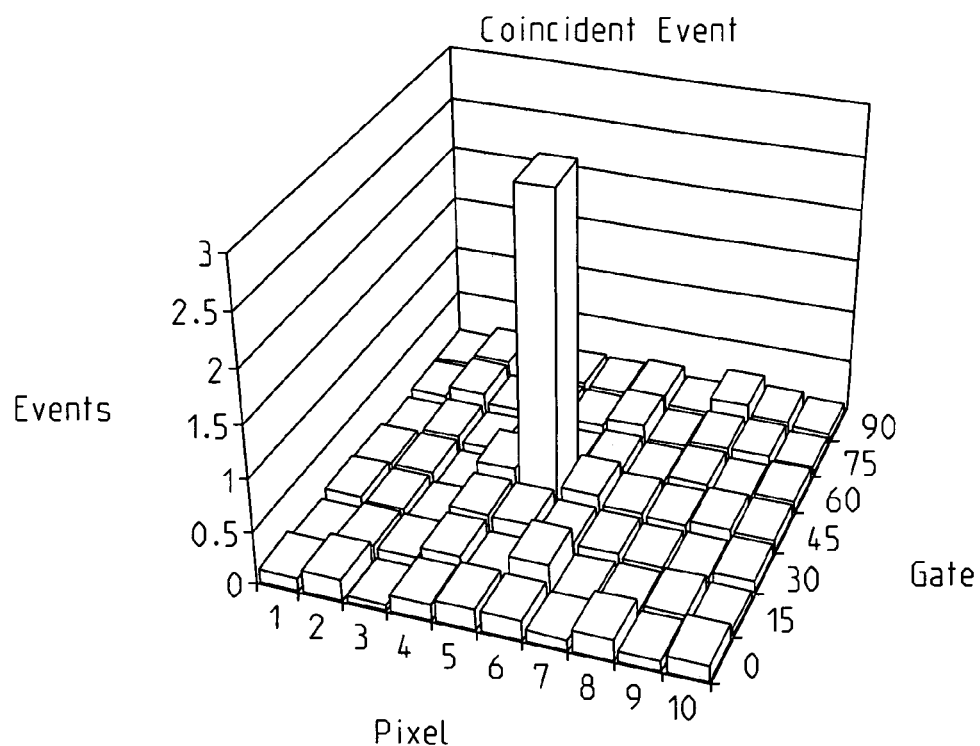
FIG. 3 illustrates gamma detection increase corresponding to SNM detection within a specific voxel

In addition to this noise reduction, by using a coincidence gate width of 10-15 nanoseconds, the time for a gamma ray to cross the assumed cargo volume, there is a further noise reduction due to the systems depth-of-field sensitivity. FIG. 3 illustrates gamma detection increase corresponding to SNM detection within a specific voxel. Given a 14.1 MeV neutron's speed of 5 centimeters per nanosecond, a depth-of-field sensitivity of approximately 50 centimeters is achieved at the trigger level using 10-15 nanosecond gates.

Figure 4:
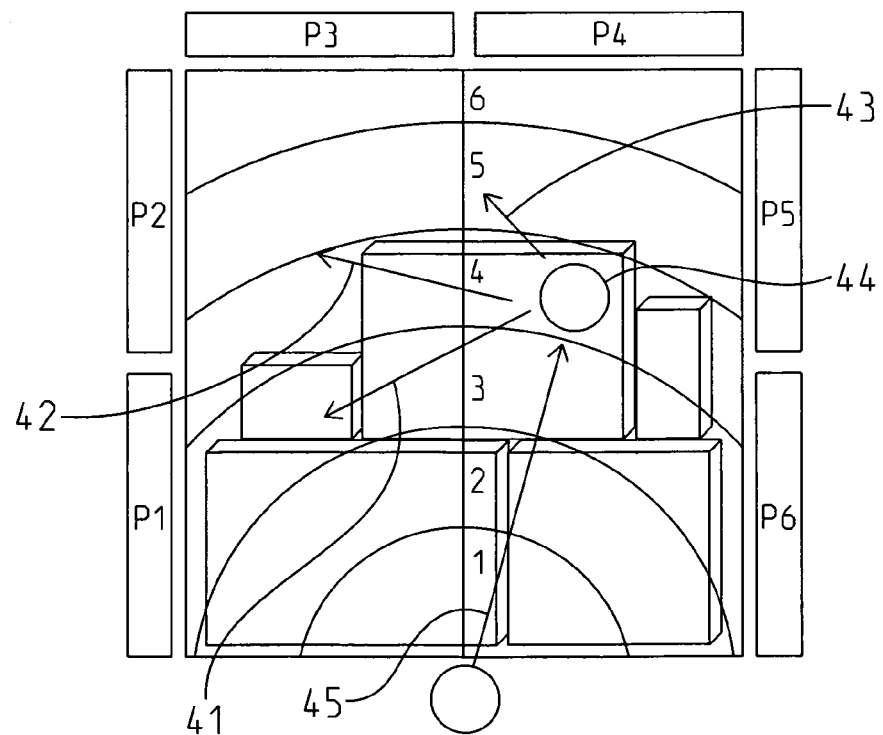
FIG. 4 depicts a fast neutron induced fission event.

A shipping container under interrogation for SNM may be subdivided into voxels which are individually inspected by "walking" the constraint on the time difference between the observation of an alpha particle and the arrival of the associated multiple gamma-rays coincidence. The pixel segmentation of the alpha detector gives the angular separation, while the coincidence timing gives depth of field separation. SNM will appear in a single voxel yielding a significant noise reduction for a coincidence gate width of 10 nanoseconds. FIG. 4 depicts a fast neutron induced fission event, in which a 14 MeV neutron 45 initiates fission in SNM 44 to produce a multi-gamma ray jet 41, 42, 43 producing coincidences in panel detectors P1, P2, and P3, and with the alpha particle within specific time gate.

In the detection of fast fission, i.e., when the system is operated to detect gamma rays in a timing relationship with alpha particle detection the minimum number of coincident detectors may be conveniently chosen as four: three (3) gamma-ray detector panels in addition to the alpha detector. Adjacent three-fold panel coincidences are selected because, Monte Carlo simulations reveal that a significant number of fission events have three (3) or more observable gamma-rays, each carrying an average energy of 1 MeV.

Figure 5:
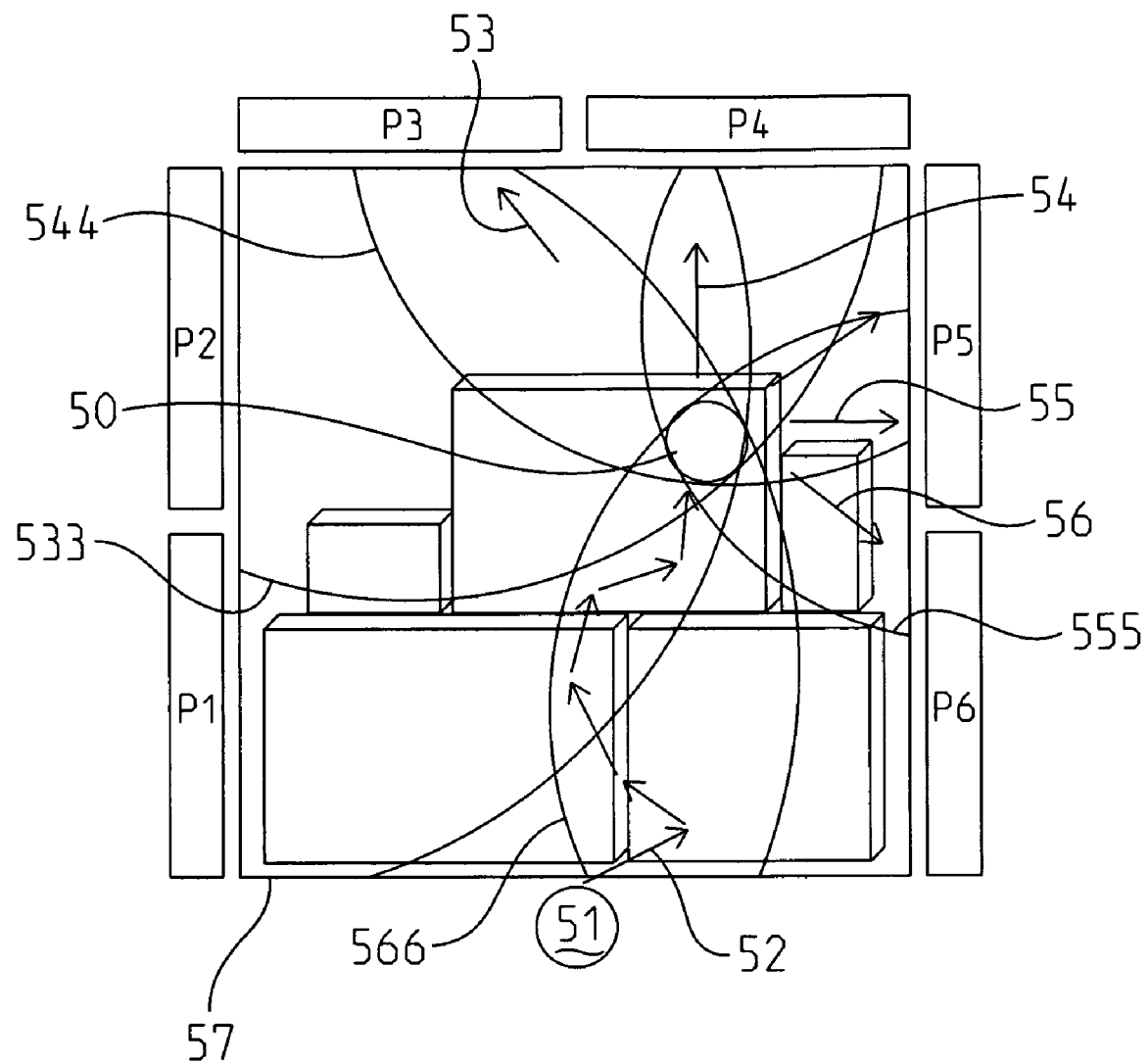
FIG. 5 depicts a fission event resulting from thermal neutron capture. The location of the event is not predictable from the alpha particle timing signal.

The second operational mode of the disclosed system is the use of four (4) coincident noble liquid detector panels independent of the prompt neutron production of alpha particle signal. As shown in FIG. 5, the slow neutron mode consists in requiring four-fold coincidences between adjacent noble liquid detector panels without use of the alpha particle detector. As illustrated in FIG. 5, panels P3, P4, P5, and P6 sense gamma rays from SNM 50 located within theoretical shipping container 57. For such events, the detected gamma rays 53, 54, 55, and 56 are assumed to be due to fissions induced by slow neutrons, which have been thermalized by material within the shipping container. The path of a theoretical thermalized neutron is illustrated as 52.

Noise or background levels are greatly reduced due to the sub-nanosecond timing resolution of the noble liquid detectors. Rapid imaging for SNM 50 can take place by simply assuming that the center of a struck panel is the terminus of the gamma. A series of one nanosecond separated arcs extending from each of the struck detectors 533, 544, 555, and 566 form a grid. Given the relative timing of the detectors, a series of grid lines are formed, the intersection of which locates the SNM as illustrated by FIG. 5. Random coincidences will uniformly populate the cargo volume where as SNM will appear at a single point within the volume. The SNM may be located within voxels of one cubic foot (0.035 m$^3$) or larger, or smaller, within the shipping container.

Operationally, requiring a 4-panel coincidence does reduce the signal from fissile materials in comparison to a 3 panel coincidence, however the nuclear cross section for thermal induced fission is hundreds of times larger than the nuclear cross section for fast neutron induced fission making this mode of operation feasible.

The combination of fast and slow neutron modes allows for the differentiation of U-235 from U-238. Both U-235 and U-238 have similar cross sections at 14 MeV (2 barn and 1 barn respectively). The fast neutron mode will yield a signal if either U-235 or U-238 is present. On the other hand, aside from a few resonances, the fission cross section for U-238 is nonexistent at thermal energies. Operation of the system for the detection of gamma radiation not in a timing relationship with alpha particle generation does not yield a signal for U-238. However, U-235's fission cross section is over 550 barns at thermal neutron energies, and therefore is the only contribution to the signal observed by the system operated in non-coincident alpha particle mode. In this way, the ratio of fast neutron and slow (thermalized) operational modes allows the identification of fissile material from fissionable materials such as U-238.

To illustrate the identification of fissile material from, simulations were performed using MCNP-Polimi (E. Padovani and S. A. Pozzi, "MCNP-Polimi ver. 1.0 User's Manual", Nov. 25, 2002)

The model geometry consisted of a 2.4 m×2.4 m×3 m steel shipping container resting on a concrete floor. The system's baseline performance was modeled using 5 kg spherical samples of U-235, U-238, and iron. A 0.5 MeV threshold was applied to the noble liquid gamma ray detectors detector panels to eliminate annihilation photons and the Kr recoil events from n-elastic scattering. A 10 nanosecond coincidence gate was utilized. All data reported are for a 30 cm cross section of a shipping container. The data were obtained using $10^9$ neutrons per second, which corresponds to less than one second of interrogation time. For the interrogation of a 40 foot-long (12.2 m) shipping container, it is expected that approximately 10 times as much data would be collected due to higher neutron flux and longer interrogation time. For an unshielded spherical sample centered in the shipping container, the expected panel coincidence rates for 3-fold and 4-fold coincidences were found to be 3 KHz and 800 Hz, respectively for U-235, and 850 Hz and 140 Hz, respectively for U-238. Expected coincidence rates for various shielded sample configurations, in which the entire container is uniformly filled with polyethylene or iron, are shown in Table 1.

Runs with iron samples have shown similar event topologies, producing both three and four panel coincidences. For 5 kg iron samples, the 3-fold coincidence rate observed is 1 kHz and the 4-fold coincidence rate is 150 Hz. In comparison with Table 1, these rates are comparable to 5 kg of U-238. These iron coincidence events are due to (n, γ) reactions which produce cascade de-excitations, resulting in the emission of several gamma rays within the 10 ns time gate. Iron has numerous energy states that can be excited by the neutrons.

Using two decision parameters, ratio of average event energy in a voxel and the ratio of 2-panel trigger to 4-panel trigger, U-235 is distinguishable from U-238 and iron in all three cargo configurations.

To understand distinguishing U-238 from common materials, the source of 3-panel and 4-panel coincidence needs to be understood. The three-fold coincidence rate in the case of U-238 is due to fast fission reactions, which do not occur for common materials. Fission of U-238 produces two excited nuclei. For this reason, we expect the average energy of the coincident gamma rays from fission consisting of the de-excitation of two nuclei to be greater than those from cascade de-excitation of a single nucleus. This is shown to be the case if we compare average event energies in each voxel shown in Table 1.

TABLE 1

Expected coincidence rates using MCNP-Polimi.

| Material | Configuration | 3-Fold Rate $R_3$ (Hz) | 4-Fold Rate $R_4$ (Hz) | Average Energy per Event (MeV) | Total Energy (MeV) | $R_3/R_4$ |
|---|---|---|---|---|---|---|
| 5 kg U-235 | Unshielded | 3025 | 800 | 6 | 22862 | ~3.7 |
|  | 0.1 g/cc plastic | 704 | 121 | 5.5 | 4516 | ~5.8 |
|  | 0.1 g/cc iron | 1192 | 213 | 5.5 | 7677 | ~5.6 |

TABLE 1-continued

Expected coincidence rates using MCNP-Polimi.

| Material | Configuration | 3-Fold Rate $R_3$ (Hz) | 4-Fold Rate $R_4$ (Hz) | Average Energy per Event (MeV) | Total Energy (MeV) | $R_3/R_4$ |
|---|---|---|---|---|---|---|
| 5 kg U-238 | Unshielded | 850 | 140 | 5.8 | 5707 | ~6 |
| | 0.1 g/cc plastic | 144 | 14 | 5.5 | 872 | ~10.2 |
| | 0.1 g/cc iron | 271 | 28 | 5.2 | 1563 | ~9.7 |
| 5 kg Iron | Unshielded | 1026 | 152 | 4.7 | 5536 | ~6.7 |
| | 0.1 g/cc plastic | 8 | 1 | 4 | 36 | ~8 |
| | 0.1 g/cc iron | 37 | 5 | 3.9 | 164 | ~7.5 |

A suitable detector for gamma-rays for use in the system should provide high stopping power in the energy range 1-6 MeV and higher, high solid angle coverage, good time resolution, high rate capability, be resistant to intensive neutron irradiation, have reasonable energy resolution, and be capable of fast readout for use in high rate trigger level coincidence electronics.

Plastic or crystal scintillation detectors are currently used to detect and identify SNM in portal systems such as Can berra CPM-VG, Nucsafe CRMS-5000NG, Polimaster PM-5000, Constellation $P^3$. Plastic scintillators have low cost, ease of fabrication in various shapes and volumes, and are simple to maintain. However, they have low stopping power and cannot effectively detect high-energy gamma rays. Crystal scintillators can be used for identification of SNM and have demonstrated relatively low false alarm rates (~1/1000) in passive portal systems due to better energy resolution in comparison to plastic scintillators. However, large volume NaI(Tl) scintillators are fragile, sensitive to temperature variations, neutron activation and are costly in large area coverage applications ~1 m², as is required for cargo inspection systems.

HPGe detectors are relatively slow, expensive and can be activated by intensive neutron irradiation.

Liquified noble gas (NGL) scintillators based on Xe and Kr provide optimal useful solution for efficient and highly sensitive detectors for operation in fieldable active interrogation systems. These scintillators provide high-light output and stopping power for high-energy gamma rays comparable to that of classic sodium iodide scintillators (Kubota, S., Nakamoto, A., Takahashi, T., Konno, Hamada, T., Miyajima, M., Hitachi, A., Shibamura E., Doke, T. Phys. Rev. B 1976, 13, 1649-1653; and D. Akimov, A. Bolozdynya, D. Churakov e. a., "Scintillating LXe/LKr Electromagnetic Calorimeter", IEEE Trans. Nucl. Sci. 1995 42, 2244-2249, both incorporated herein by reference. At the same time, NGL scintillators are faster and more resistant to neutron activation than NaI (Tl) Sergey E. Ulin, K. F. Vlasik, A. M. Galper, V. M. Grachev, Valery V. Dmitrenko, V. I. Liagushin, Z. M. Uteshev, and Yu. T. Yurkin, Proceedings of SPIE, Volume 3114, October 1997, pp. 499-504, incorporated herein by reference, a material feature for this application. Among NGL scintillators Liquid Xenon demonstrates the best scintillation properties. Krypton is less expensive than Xe and available in large quantities.

It was demonstrated in Akimov, D., Bolozdynya, A., Churakov, D., Koutchenkov, A., Kuzichev, V., Lebedenko, V., Rogovsky, I., Chen, M., Chepel, V., Sushkov, V. Nucl. Instr. Meth. A 1993, 327, 155-158; and Akimov, D. Yu., Bolozdynya, A. I., Churakov, D. L., Lamkov, V. A., Sadovsky, A. A., Safronov, G. A., Smirnov, G. N. Nucl. Instr. Meth. A 1993, 327, 575-576 that LKr in a mixture with about 1% Xe provides practically the same scintillation properties as pure LXe. As an example the disclosed system can use this mixture as the most promising scintillation material for large area scintillation detectors. This type of detector can provide sub-nanosecond time resolution and effective detection of high energy gamma rays.

The system electronics consists of the front end electronics, the coincidence electronics and trigger, the reconstruction electronic processor, the Data AcQuistion (DAQ) and operator interface. The electronics are largely composed of application-specific integrated circuits (ASIC)

The sources of signals to the data acquisitions system (DAQ) are the pulses from the individual alpha detectors pixels and individual pixels within each gamma ray detection panel. The first level of electronics provides both (1) signal shaping of the raw detector signals using discriminators in order to allow fast timing decision making and (2) signal pass through to an analog to digital converters (ADC) for the gamma ray detector signals in order to associate a gamma ray energy with each timing pulse. Because the system requires timing accuracy at the 1 nanosecond level, computer controlled time delays for each signal source is provided so that all source signals have the correct relative timing.

The electronics provides signal shaping of the raw detector signals and computer controlled time delays for each channel, two primary trigger modes performs ev-ent location reconstruction based on (1) panel timing information and (2) panel timing information with alpha particle transducer position and timing information as the clock start. The front end receives the raw signal pulses and converts them into logic pulses with sub-nanosecond rise times. There is also individual channel time-delay to place all detector signals in correct relative time for precise triggering and event reconstruction. The trigger level timing and coincidences may be chosen to advantageously inspect the objects/containers of concern. Timing for the instant system is exemplified at the time it takes a gamma ray to cross an ocean-going shipping container, about 10 nanoseconds.

The invention claimed is:

1. A system for the detection of special nuclear materials (SNM) in a first volume comprising:
    an associated-particle neutron generator positioned to emit neutrons toward at least a portion of the first volume;
    a plurality of gamma ray detectors that each
        are positioned around the portion of the first volume,
        are capable of nanosecond timing, and
        produce output data that correlates to the quantity of gamma rays received by the detector within a timing gate; and
    a device that acquires and processes the output data from each gamma ray detector to produce an identification output signal when the output data indicates that each of at least n adjacent detectors of the plurality of gamma ray detectors detected at least one gamma ray within their respective defined periods of time,
    where n>2 and the timing gates of the detectors are related.

2. The system of claim 1 wherein the plurality of gamma ray detectors are noble liquid detectors.

3. The system of claim 1 wherein the device locates fissionable material within a voxel within the first volume.

4. The system of claim 1 also comprising an alpha particle detector.

5. The system according to claim 1 wherein the plurality of gamma ray detectors collectively cover at least about fifty percent of the solid angle that the surface of the first volume subtends as observed from the cross-sectional center of the larger space.

6. The system of claim 4 wherein background noise caused by gamma rays not originating from SNM is reduced by adjusting the detector timing gate coincident with the detection of an alpha particle.

7. The system of claim 4 wherein the alpha particle detector is pixilated.

8. The system of claim 1 wherein the gamma ray detector is pixilated.

9. The system of claim 1 wherein gamma ray detection signals are collected in a time gate of 20 nanoseconds or less.

10. A method of interrogating a sample volume for the detection of fissionable materials comprising:
   a. impacting a sample with neutrons from an associated-particle neutron generator;
   b. detecting gamma rays emitted from fissionable material impacted by ballistic neutrons generated by the neutron generator by means of a number n of detectors during a timing gate, where n is three or more and the timing gates for the respective detectors are related; and
   c. outputting to a user interface a signal indicating the coincident detection of gamma rays by each of at least n adjacent detectors.

11. The method of claim 10 wherein the detectors are positioned around the sample.

12. The method of claim 10 wherein the starting point of the timing gate is adjusted as a function of the timing of the detection of an alpha particle.

13. The method of claim 10 wherein the number n is at least four.

14. The method of claim 12 wherein a pixilated alpha particle detector provides angular separation and on the order of nanosecond timing of the detection of gamma rays and yields depth of field to establish the location of SNM in a sample volume, and outputting to a user interface the detection of gamma rays and the location of SNM within a sample volume.

15. The method of claim 13 wherein the detectors each have pixels that detect the gamma rays, the method further comprising calculating the location of the intersection of arcs extended from the pixels actually detecting the gamma rays, outputting to a user interface the detection of gamma rays and the location of SNM within a sample volume.

16. The method of claim 10, wherein the detectors are noble liquid detectors.

* * * * *

UNITED STATES PATENT AND TRADEMARK OFFICE
CERTIFICATE OF CORRECTION

PATENT NO. : 8,373,129 B2
APPLICATION NO. : 12/587865
DATED : February 12, 2013
INVENTOR(S) : David S. Koltick It is certified that error appears in the above-identified patent and that said Letters Patent is hereby corrected as shown below:

On the title page, item (75), correct the last name of the inventor from "Kotlick" to --Koltick--.

Signed and Sealed this
Twenty-first Day of May, 2013

Teresa Stanek Rea
*Acting Director of the United States Patent and Trademark Office*